United States Patent
Araki et al.

(10) Patent No.: US 9,813,578 B2
(45) Date of Patent: Nov. 7, 2017

(54) DEVICE AND INFORMATION PROCESSING METHOD IN WHICH A RECEIVED PROGRAM CAUSES A DEVICE TO EXECUTE IMAGE PROCESSING

(71) Applicants: Ryoji Araki, Fukuoka (JP); Kunihiro Akiyoshi, Fukuoka (JP)

(72) Inventors: Ryoji Araki, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/806,836

(22) Filed: Jul. 23, 2015

(65) Prior Publication Data
US 2016/0044200 A1    Feb. 11, 2016

(30) Foreign Application Priority Data
Aug. 5, 2014 (JP) .................................. 2014-159452

(51) Int. Cl.
H04N 1/00 (2006.01)
H04N 1/32 (2006.01)

(52) U.S. Cl.
CPC ..... *H04N 1/00941* (2013.01); *H04N 1/00973* (2013.01)

(58) Field of Classification Search
None
See application file for complete search history.

(56) References Cited

U.S. PATENT DOCUMENTS

| 8,358,866 | B2* | 1/2013 | Qian | G06T 5/10 358/3.26 |
|---|---|---|---|---|
| 2002/0008878 | A1* | 1/2002 | Ishizuka | H04N 1/00236 358/1.6 |
| 2004/0218208 | A1* | 11/2004 | Akiyoshi | G06F 8/41 358/1.15 |
| 2011/0225600 | A1 | 9/2011 | Araki | |
| 2014/0047324 | A1* | 2/2014 | Sasakuma | G06F 17/2247 715/234 |
| 2015/0074667 | A1 | 3/2015 | Araki | |

FOREIGN PATENT DOCUMENTS

JP    2011-191951    9/2011

OTHER PUBLICATIONS

U.S. Appl. No. 14/627,142, filed Feb. 20, 2015.

* cited by examiner

*Primary Examiner* — Thomas D Lee
(74) *Attorney, Agent, or Firm* — IPUSA, PLLC

(57) ABSTRACT

A device is connected to an information processing apparatus via a network. The device includes a receiving unit configured to receive a program from the information processing apparatus via the network; and a calling unit configured to call the program received by the receiving unit. The program causes the device to execute a process with respect to data stored in the device.

12 Claims, 6 Drawing Sheets

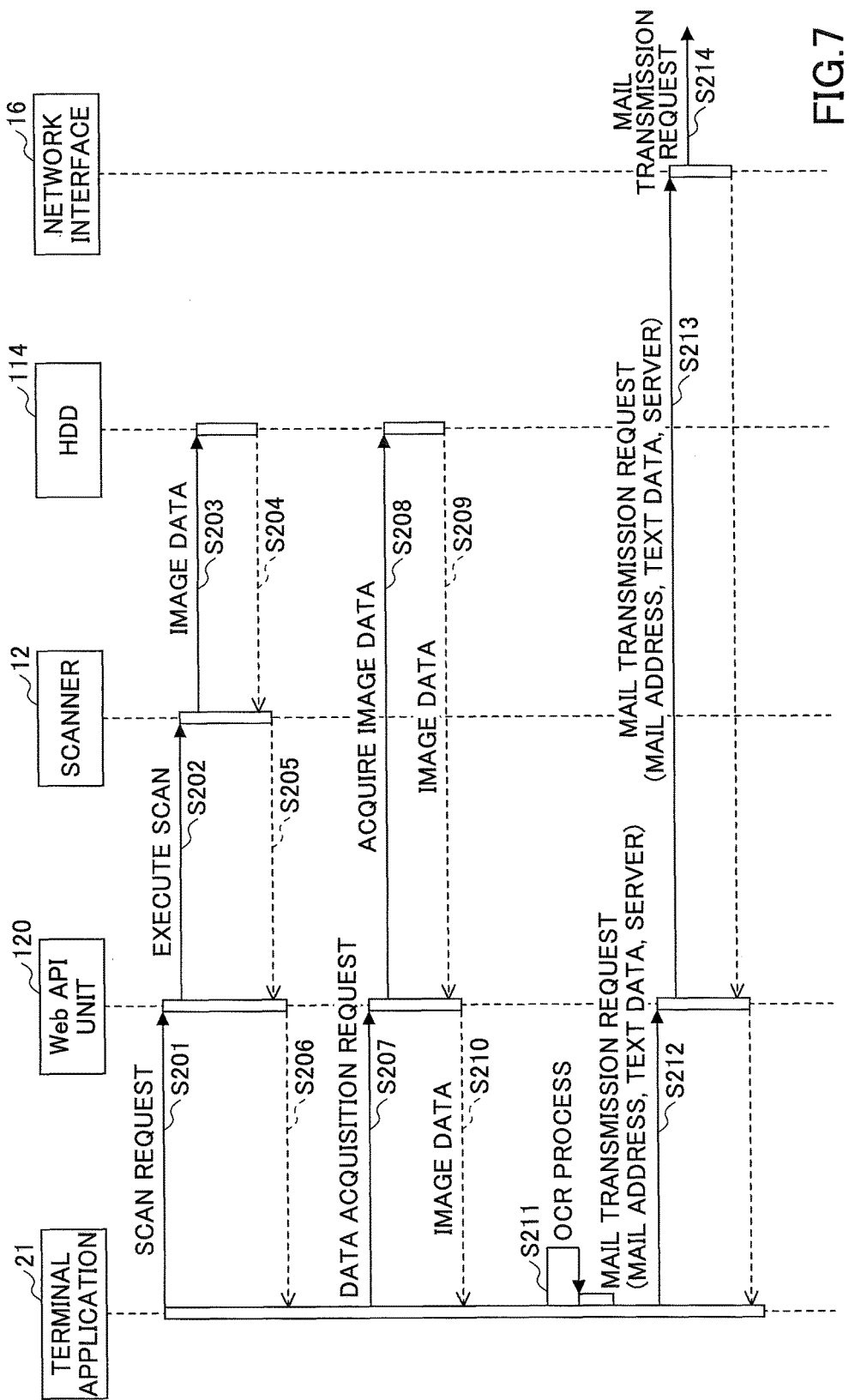

DEVICE AND INFORMATION PROCESSING METHOD IN WHICH A RECEIVED PROGRAM CAUSES A DEVICE TO EXECUTE IMAGE PROCESSING

BACKGROUND OF THE INVENTION

1. Field of the Invention

The present invention relates to a device and an information processing method.

2. Description of the Related Art

Among devices such as an image forming apparatus, there is a device provided with an API (Application Program Interface) as an interface which makes it possible to use various resources relevant to the device, via a network. By using such an API, it is possible to implement an application using various resources relevant to the device, with respect to an apparatus that is connected via a network to a device that is provided with the API. For example, an application for executing a process with respect to image data obtained by a scanning process of the device, can be implemented in an apparatus connected to the device via a network.

When the above-described application is to perform a process that is not implemented at the device, or to perform a process that cannot be implemented by an API that is made public by the device, on image data scanned at the device, the image data may be transferred to an apparatus in which the application is implemented. Accordingly, the application can directly execute the process on the image data.

However, when the communication band of the network connecting the device and the apparatus is narrow, the transfer time of image data from the device to the apparatus becomes a bottleneck, and the overall processing time may be prolonged.

SUMMARY OF THE INVENTION

The present invention provides a device and an information processing method, in which one or more of the above-described disadvantages are eliminated.

According to an aspect of the present invention, there is provided a device connected to an information processing apparatus via a network, the device including a receiving unit configured to receive a program from the information processing apparatus via the network; and a calling unit configured to call the program received by the receiving unit, wherein the program causes the device to execute a process with respect to data stored in the device.

According to an aspect of the present invention, there is provided an information processing method performed by a device connected to an information processing apparatus via a network, the information processing method including receiving a program from the information processing apparatus via the network; and calling the program received at the receiving, wherein the program causes the device to execute a process with respect to data stored in the device.

According to an aspect of the present invention, there is provided a computer program product for being executed on a computer that constitutes a device connected to an information processing apparatus via a network, including receiving a program from the information processing apparatus via the network; and calling the program received at the receiving, wherein the program causes the device to execute a process with respect to data stored in the device.

BRIEF DESCRIPTION OF THE DRAWINGS

Other objects, features and advantages of the present invention will become more apparent from the following detailed description when read in conjunction with the accompanying drawings, in which:

FIG. 7 is a sequence diagram for describing an example of processing procedures in a case where the extension program is not applied.

DETAILED DESCRIPTION OF THE PREFERRED EMBODIMENTS

Figure 1:
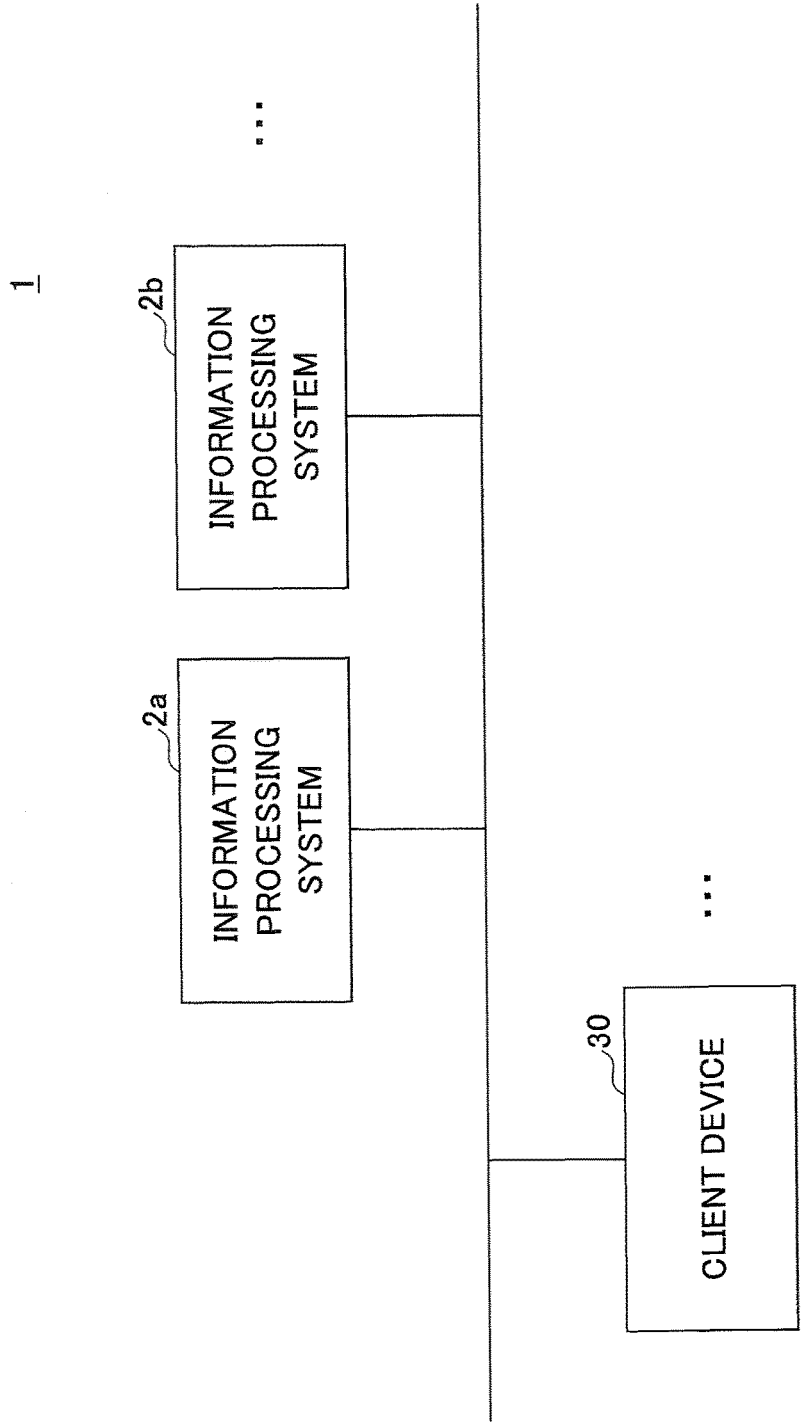
FIG. 1 illustrates a system configuration example according to an embodiment of the present invention.

A description is given, with reference to the accompanying drawings, of embodiments of the present invention. FIG. 1 illustrates a system configuration example according to an embodiment of the present invention. In a system 1 illustrated in FIG. 1, one or more client devices 30, and one or more information processing systems 2 such as information processing systems 2a and 2b, are communicably connected to each other via a network such as LAN (Local Area Network) and the Internet. Note that when the information processing systems 2a and 2b are not distinguished from each other, these are referred to as an information processing system 2.

The client device 30 is an example of an apparatus in which an application program using API (Application Program Interface), which is included in the information processing system 2, is implemented. Examples of the client device 30 are a PC (Personal Computer), a tablet terminal, a smartphone, a mobile phone, etc.

The information processing system 2 is an assembly of two or more information processing apparatuses for executing a process in cooperation with each other.

Figure 2:
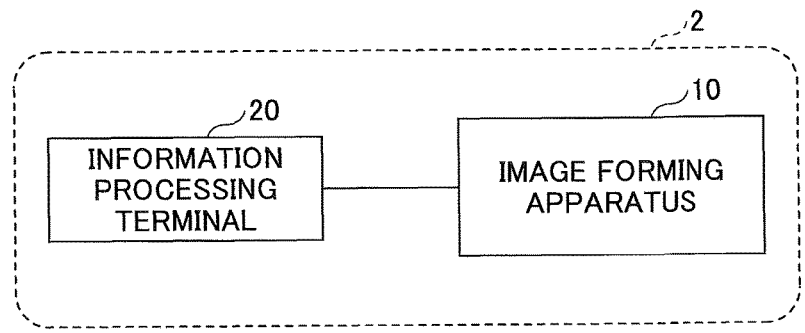
FIG. 2 illustrates a configuration example of the information processing system according to an embodiment of the present invention.

FIG. 2 illustrates a configuration example of the information processing system 2 according to an embodiment of the present invention. In the information processing system 2 illustrated in FIG. 2, an image forming apparatus 10 is communicably connected with an information processing terminal 20. The communication between the image forming apparatus 10 and the information processing terminal 20 is performed by, for example, USB (Universal Serial Bus), near field communication, or via network such as LAN (wired or wireless).

The image forming apparatus 10 is a multifunction peripheral that realizes two or more functions among printing, scanning, copying, and fax transmission and reception, by a single housing. However, a device that includes any one of these functions may be used as the image forming apparatus 10. Furthermore, a device such as a projector, a TV conference system, or a digital camera may be used instead of the image forming apparatus 10. Note that the API included in the information processing system 2 described with reference with FIG. 1, is the API included in the image forming apparatus 10.

The information processing terminal 20 is an electronic device that can execute information processing completely independently, such as a smartphone and a tablet terminal. In the present embodiment, the information processing terminal 20 functions as an operation unit of the image forming apparatus 10. More specifically, the information processing terminal 20 is connected to the image forming apparatus 10 instead of the conventional operation panel installed as an operation unit exclusively used for the image forming apparatus 10. Furthermore, similar to the client device 30, the information processing terminal 20 is an example of an apparatus in which an application using API included in the image forming apparatus 10 is implemented.

For example, the information processing terminal 20 is set in a fixed manner at a predetermined position (for example, a position where the operation panel is arranged) of the image forming apparatus 10. Therefore, the information processing terminal 20 and the image forming apparatus 10 may be recognized as a single apparatus. Alternatively, the information processing terminal 20 may be removable (separable) from the image forming apparatus 10. In a state where the information processing terminal 20 is removed, the information processing terminal 20 may function as an operation unit of the image forming apparatus 10 via wireless communication using Bluetooth (registered trademark), infrared rays, or wireless LAN, etc.

Figure 3:
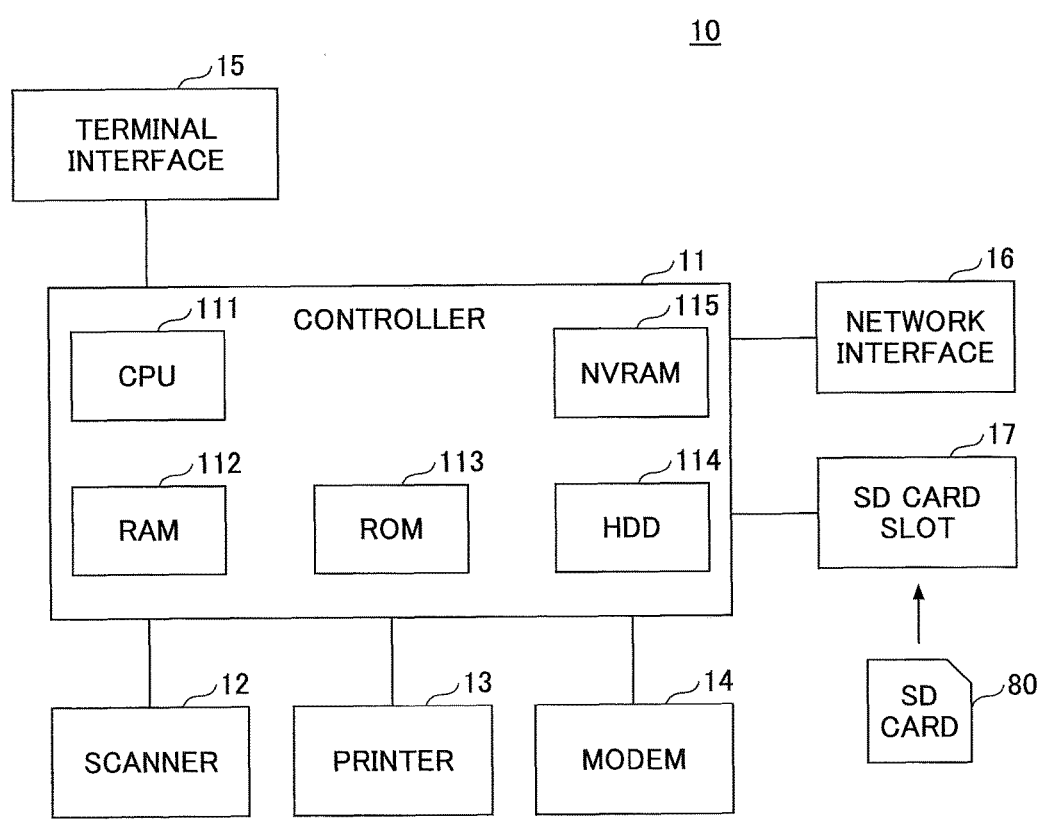
FIG. 3 illustrates a hardware configuration example of an image forming apparatus according to an embodiment of the present invention.

FIG. 3 illustrates a hardware configuration example of the image forming apparatus 10 according to an embodiment of the present invention. In FIG. 3, the image forming apparatus 10 includes hardware elements such as a controller 11, a scanner 12, a printer 13, a modem 14, a terminal interface 15, a network interface 16, and an SD card slot 17.

The controller 11 includes a CPU 111, a RAM 112, a ROM 113, a HDD 114, and a NVRAM 115. The ROM 113 stores various programs and data, etc., used by programs. The RAM 112 is used as a storage area for loading programs, a work area of the loaded programs, etc. The CPU 111 realizes various functions by processing the programs loaded in the RAM 112. The HDD 114 stores programs and various kinds of data, etc., used by the programs. The NVRAM 115 stores various kinds of setting information, etc.

The scanner 12 is a hardware element (image reading unit) for reading image data from an original document. The printer 13 is a hardware element (printing unit) for printing print data onto a print sheet. The modem 14 is a hardware element for connecting to a telephone line, and is used for executing the transmission and reception of image data by fax communication. The terminal interface 15 is an interface for communicating (connecting) with the information processing terminal 20. For example, the terminal interface 15 may be a USB interface or a hardware element for near field communication. Alternatively, the terminal interface 15 may be a hardware element for connecting to a network (wired or wireless) such as LAN. The network interface 16 is a hardware element for connecting to a network (wired or wireless) such as LAN. The SD card slot 17 is used for reading programs stored in an SD card 80. That is, in the image forming apparatus 10, not only programs stored in the ROM 113, but programs stored in the SD card 80 may also be loaded in the RAM 112 and executed. Note that the SD card 80 may be substituted by other recording media (for example, a CD-ROM or a USB (Universal Serial Bus) memory, etc.). That is, the type of recording medium corresponding to the positioning of the SD card 80 is not limited to a predetermined type. In this case, the SD card slot 17 is to be substituted by a hardware element according to the type of recording medium.

Figure 4:
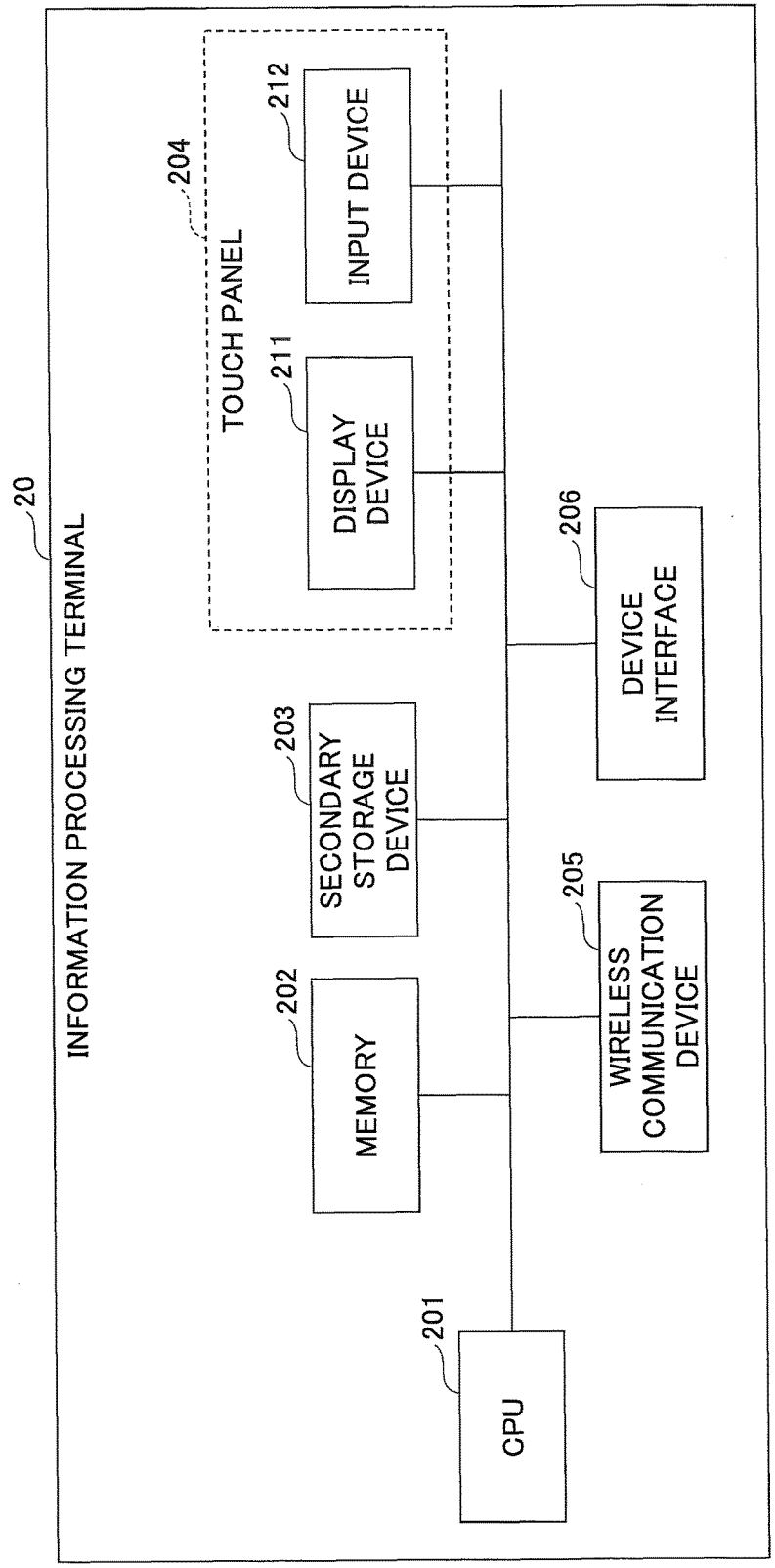
FIG. 4 illustrates a hardware configuration example of an information processing terminal according to an embodiment of the present invention.

FIG. 4 illustrates a hardware configuration example of the information processing terminal 20 according to an embodiment of the present invention. In FIG. 4, the information processing terminal 20 includes a CPU 201, a memory 202, a secondary storage device 203, a touch panel 204, a wireless communication device 205, and a device interface 206.

The secondary storage device 203 stores programs installed in the information processing terminal 20. The memory 202 reads a program from the secondary storage device 203 and stores the read program, when an instruction to activate the program is received. The CPU 201 realizes functions relevant to the information processing terminal 20, in accordance with programs stored in the memory 202.

The touch panel 204 is an electronic component having both an input function and a display function, and displays information and receives input from a user. The touch panel 204 includes a display device 211 and an input device 212.

The display device 211 is a liquid crystal display, etc., and bears the display function of the touch panel 204. The input device 212 is an electronic component including a sensor for detecting the touch of a contact object with respect to the display device 211. The method of detecting the touch of a contact object may be any known method such as an electrostatic method, a resistance film method, an optical method, etc. Note that a contact object is an object that touches the contact surface (front side) of the touch panel 204. An example of such an object is the finger of the user or an exclusive-use pen, a generally used pen, etc. The wireless communication device 205 is an electronic component such as an antenna, which is needed for performing communication in wireless LAN (Local Area Network) or a mobile communication network. The device interface 206 is an interface for communicating with the image forming apparatus 10. That is, the device interface 206 communicates with the image forming apparatus 10 according to a mode corresponding to the terminal interface 15.

Figure 5:
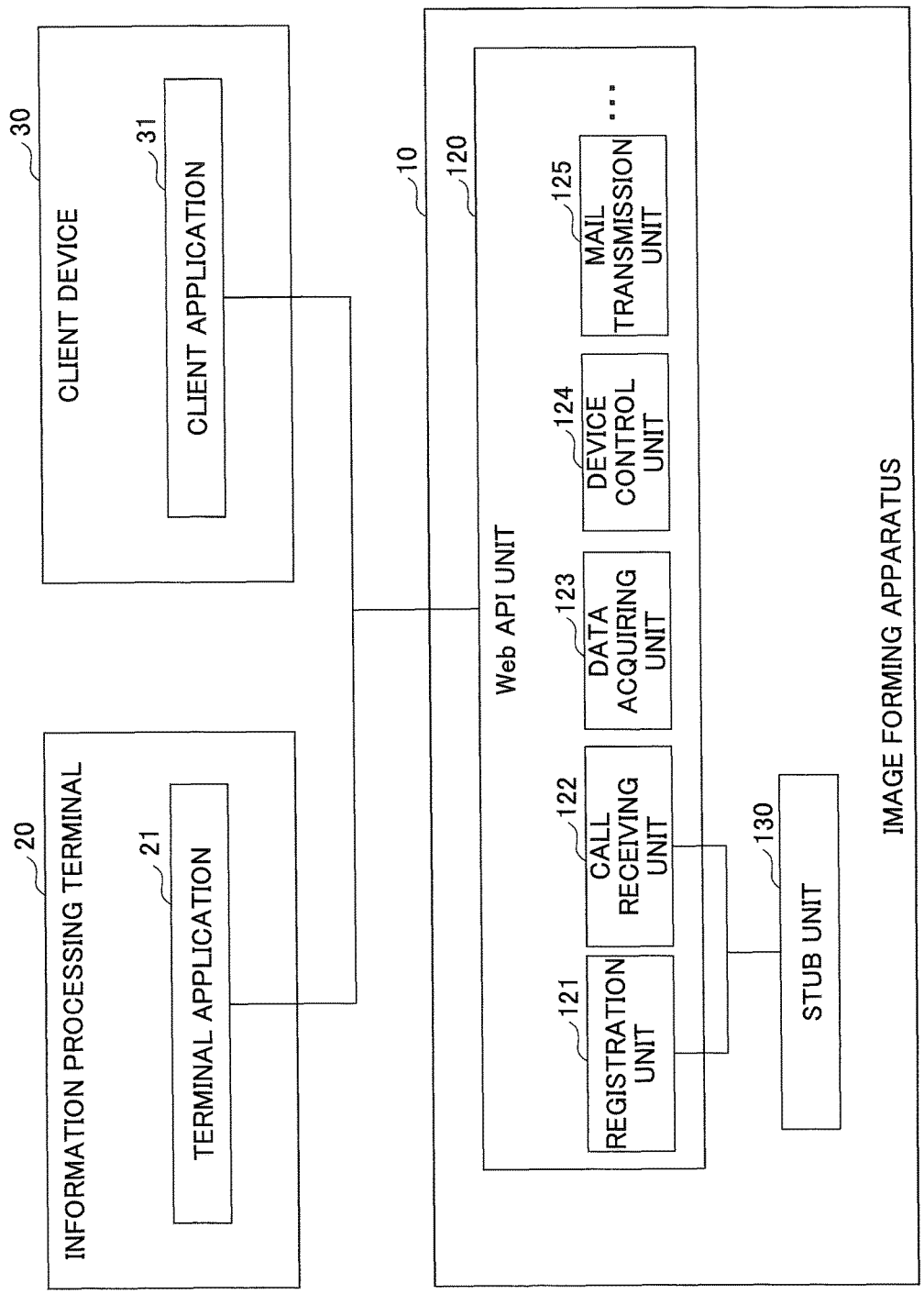
FIG. 5 illustrates a functional configuration example of the devices according to an embodiment of the present invention.

FIG. 5 illustrates a functional configuration example of the devices according to an embodiment of the present invention. In FIG. 5, the image forming apparatus 10 includes a web API unit 120 and a stub unit 130. These units are realized by a process that the CPU 111 is caused to execute by one or more programs installed in the image forming apparatus 10.

The web API unit 120 provides an API as an interface for making it possible to operate various resources of the image forming apparatus 10 from outside, and also includes the implementation of the API. In the present embodiment, the web API unit 120 provides the API by a web interface. For example, the API provided by the web API unit 120 can be called by using HTTP (HyperText Transfer Protocol). Furthermore, the API may be conforming to REST (Representational State Transfer). In the following, the API provided by the web API unit 120 is referred to as "web API". However, the API provided by the web API unit 120 does not need to depend on a particular protocol.

In FIG. 5, the web API unit 120 includes a registration unit 121, a call receiving unit 122, a data acquiring unit 123, a device control unit 124, and a mail transmission unit 125. These units are realized by processes that the CPU 111 is caused to execute, by any function or method (hereinafter, collectively referred to as "function") among the group of functions or a group of methods constituting the web API.

The registration unit 121 corresponds to a registration function that is one web API. A registration function is a function for receiving a registration request to register a program in the image forming apparatus 10. That is, when the registration unit 121 receives a registration request to register a program in the image forming apparatus 10 from the information processing terminal 20 or the client device 30, the registration unit 121 requests the stub unit 130 to register the program. The program is for temporarily or continuously changing or extending the function of the image forming apparatus 10. In the following, such a program is referred to as an "extension program". The extension program is preferably a program that can be dynamically called, such as DLL (Dynamic Link Library), a JAR (Java (registered trademark) Archive) file, or a script (for example, a Java (registered trademark) script). When a program can be dynamically called, it means that a static link is not necessary.

The call receiving unit 122 responds to a call function that is one web API. A call function is a function for receiving a call request to call an extension program. That is, when the call receiving unit 122 receives a call request to call an extension program from the information processing terminal 20 or the client device 30, the call receiving unit 122 requests the stub unit 130 to call the extension program.

The data acquiring unit 123 responds to a data acquisition function that is one web API. A data acquisition function is a function for receiving a request to acquire data stored in the image forming apparatus 10. That is, when the data acquiring unit 123 receives a request to acquire data from the information processing terminal 20 or the client device 30, the data acquiring unit 123 returns, to the request source, the data corresponding to the identification information specified in the acquisition request. Note that examples of such data are image data scanned in the image forming apparatus 10, and print data that has been received in the image forming apparatus 10 and that is waiting to be output.

The device control unit 124 responds to a control function that is one web API. A control function is a function for receiving a request to control the hardware resources of the image forming apparatus 10. That is, when the device control unit 124 receives a request to control the image forming apparatus 10 from the information processing terminal 20 or the client device 30, the device control unit 124 causes the image forming apparatus 10 to execute an operation requested in the control request. An example of such a control request is a request to execute scanning.

The mail transmission unit 125 responds to a mail transmission function that is one web API. The mail transmission function is a function for receiving a request to transmit an e-mail. That is, when the mail transmission unit 125 receives a request to transmit an e-mail form the information processing terminal 20 or the client device 30, the mail transmission unit 125 sends the e-mail including information specified in the transmission request, to a destination address specified in the transmission request.

The stub unit 130 executes a registration process of an extension program relevant to a registration request from the registration unit 121, and a process of calling an extension program relevant to a call request from the call receiving unit 122. Registration of an extension program means, for example, to store the extension program in a predetermined position (for example, a predetermined folder) managed by the stub unit 130 in the HDD 114. An extension program includes an interface (for example, a function of a predetermined name) scheduled by the stub unit 130. The stub unit 130 calls the extension program via the interface.

The information processing terminal 20 includes a terminal application 21. The terminal application 21 is an example of an application program that uses the web API of the image forming apparatus 10. Note that the information processing terminal 20 may include a plurality of types of terminal applications 21.

The client device 30 includes a client application 31. The client application 31 is an example of an application program that uses the web API of the image forming apparatus 10. Note that the client device 30 may include a plurality of types of client application 31.

Note that the terminal application 21 and the client application 31 are to be created in formats appropriate for their respective install destinations, i.e., the information processing terminal 20 or the client device 30. For example, the programming language of the terminal application 21 and the programming language of the client application 31 may be different from each other.

In the following, a description is given of processing procedures executed by the information processing terminal 20 and the image forming apparatus 10. Note that in the present embodiment, as a matter of convenience, a description of the process executed by the client device 30 is omitted; however, in the following description, the information processing terminal 20 may be replaced by the client device 30.

Figure 6:
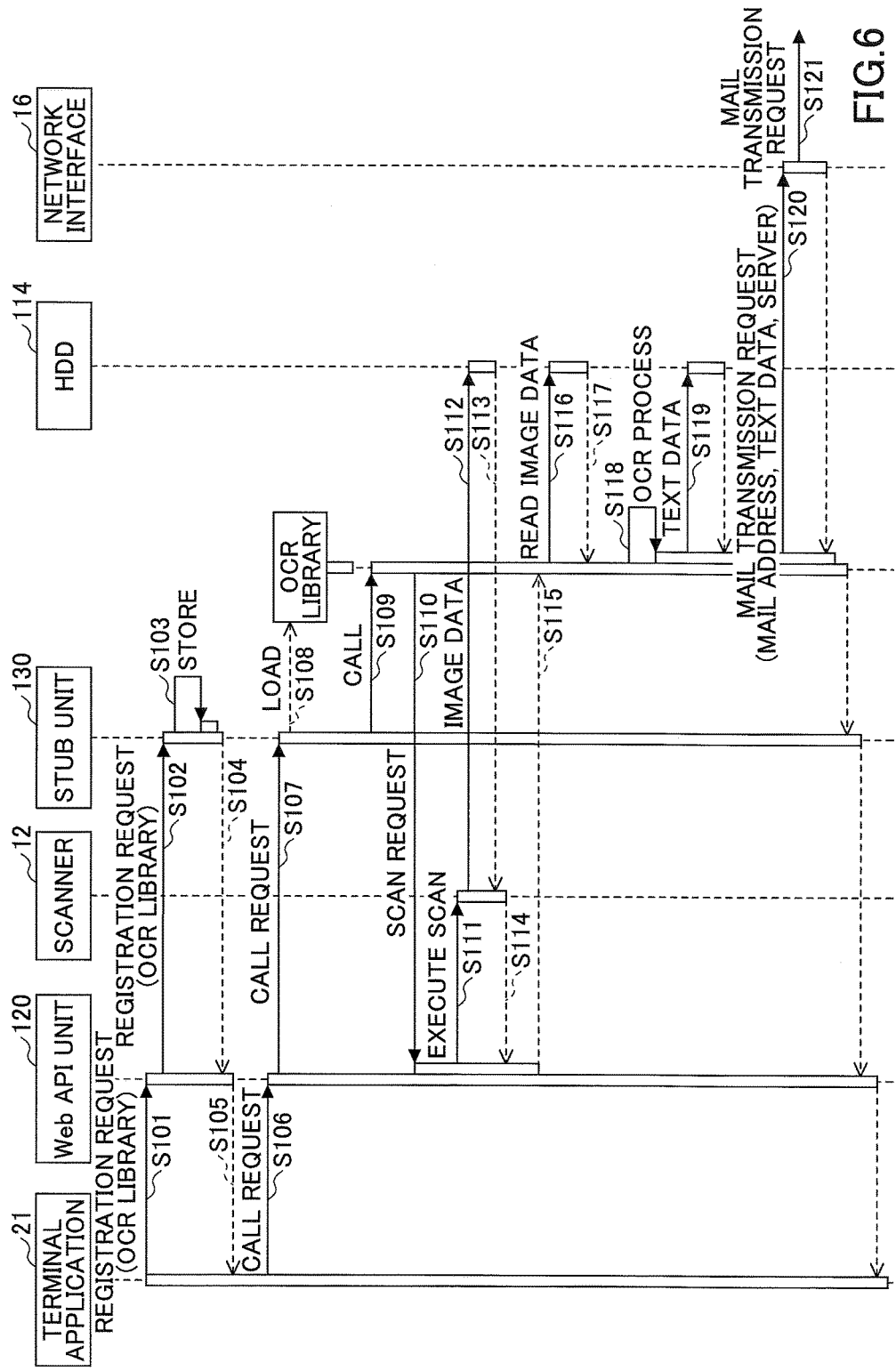
FIG. 6 is a sequence diagram for describing an example of processing procedures executed by the information processing terminal and the image forming apparatus.

FIG. 6 is a sequence diagram for describing an example of processing procedures executed by the information processing terminal 20 and the image forming apparatus 10.

In step S101, the terminal application 21 calls the registration function that is one web API. That is, the terminal application 21 sends a request to register the extension program, to the image forming apparatus 10. The registration request includes the extension program that is the registration target. In the present embodiment, an "OCR library" is an example of an extension program. An OCR library is a program that causes the image forming apparatus 10 to execute scanning of image data from an original document, an OCR (Optical Character Recognition) process respect to the image data, and a process of sending text data obtained by the OCR process by e-mail. In the present embodiment, the image forming apparatus 10 does not include the OCR function. Alternatively, the image forming apparatus 10 does not have an OCR function of a performance level requested by the terminal application 21.

When the registration unit 121, which is part of the web API unit 120, receives the registration request, the registration unit 121 requests the stub unit 130 to register the OCR library included in the registration request (step S102). Note that the registration request may also include setting information relevant to the OCR library, other than the program main body of the OCR library. The setting information may include parameters relevant to scanning, parameters relevant to an OCR process, and parameters relevant to the mail transmission process.

Next, the stub unit 130 stores the OCR library in a predetermined position (step S103), and returns a response to the registration unit 121 (step S104). In response to the response, the registration unit 121 returns a response to the terminal application 21 (step S105).

Next, the terminal application 21 calls a call function that is one web API. That is, the terminal application 21 sends a call request to call the extension program, to the image forming apparatus 10. The call request may include identification information of the extension program that is the call target. The identification information (hereafter, "program ID") may be applied by, for example, the stub unit 130, and may be included in the response from the stub unit 130 in step S104. In this case, in the response of step S105, a program ID may be reported to the terminal application 21. Note that the call request for the extension program may be recognized as a request to execute the extension program.

When the call receiving unit 122, which is part of the web API unit 120, receives the call request, the web API unit 120 reports the call request to the stub unit 130 (step S107). Next, the stub unit 130 dynamically loads, in the RAM 112, the OCR library, which is the call target in the call request (step S108). Next, the stub unit 130 executes the OCR library by calling a predetermined function included in the OCR library (step S109). Note that in the following, the process that the OCR library causes the CPU 111 to execute is described as the process executed by the OCR library, as a matter of convenience.

Next, the OCR library requests the device control unit 124 to execute scanning, by calling the control function that is one web API (step S110). That is, the OCR library sends the request to execute scanning to the device control unit 124 via the control function. As described above, the web API may be called from inside the image forming apparatus 10.

When the device control unit 124 receives the request to execute scanning, the device control unit 124 causes the scanner 12 to execute scanning of the original document (step S111). Note that the original document is set by the user in advance. The image data scanned from the original document by the scanner 12 is stored in a predetermined position (for example, a predetermined folder) in the HDD 114 (step S112). When the storing of the image data is completed and the control of the process returns to the device control unit 124 (steps S113, S114), the device control unit 124 returns a response to the OCR library (step S115). The response may include identification information of the stored image data (hereinafter, "data ID"). The data ID may be a file name or identification information in another format.

Next, the OCR library loads the image data corresponding to the data ID into the RAM 112 from the HDD 114 (steps S116, S117). The OCR library executes an OCR process with respect to the loaded image data (step S118). Text data is generated by the OCR process. Next, the OCR library stores the text data in the HDD 114 (step S119). However, the text data need not be stored. Next, for example, the OCR library sends a request to transmit an e-mail that includes the text data in the body text and that is addressed to a predetermined mail address, to a predetermined mail server by using the network interface 16 (steps S120, S121). As a result, an e-mail including the text data is sent to the predetermined mail address. Note that the predetermined mail address and the IP address of the predetermined mail server may be included in, for example, the setting information of the OCR library.

Note that the registration function and the call function do not have to be distinguished from each other. Alternatively, a single function may be implemented, which realizes the functions of both the registration function and the call function. In this case, after step S103, steps S108 and onward may be executed. However, by distinguishing the registration function and the call function, for example, when the same extension program is to be called for a plurality of times, it is possible to reduce the need of transferring the extension program every time.

Next, as a reference, a description is given of an example of processing procedures for realizing the same functions as the functions realized by the processing procedures described with reference to FIG. 6, in a case where there is no registration function or call function, i.e., in a case where an extension program (OCR library) is not applied to the image forming apparatus 10.

FIG. 7 is a sequence diagram for describing an example of processing procedures in a case where the extension program is not applied.

In step S201, the terminal application 21 requests the image forming apparatus 10 to execute scanning by calling a control function which is one web API (step S201). That is, the terminal application 21 sends a request to execute scanning to the device control unit 124. When the device control unit 124 receives the request to execute scanning, the device control unit 124 causes the scanner 12 to execute scanning (step S202). The image data scanned from the original document by the scanner 12 is stored in the HDD 114 (step S203). When the storing of the image data is completed and the control of the process returns to the device control unit 124 (steps S204, S205), the device control unit 124 returns a response to the terminal application 21 (step S206). The response may include data ID of the stored image data.

Next, the terminal application 21 calls a data acquisition function that is one web API (step S207). That is, the terminal application 21 sends a request to acquire data to the image forming apparatus 10. The acquisition request includes the data ID. When the data acquiring unit 123 that is part of the web API unit 120 receives the acquisition request, the data acquiring unit 123 acquires the image data corresponding to the data ID included in the acquisition request, from the HDD 114 (steps S208, S209). Next, the data acquiring unit 123 returns a response including the image data to the terminal application 21 (step S210).

Next, the terminal application 21 executes an OCR process with respect to the image data (step S211). Text data is generated by the OCR process. Next, the terminal application 21 calls a mail transmission function that is one web API. That is, the terminal application 21 sends a request to transmit an e-mail, to the image forming apparatus 10. The transmission request includes the text data generated by the OCR process, the mail address that is the destination, the IP address of the mail server, etc.

When the mail transmission unit 125 that is part of the web API unit 120 receives the transmission request, the mail transmission unit 125 sends a request to transmit an e-mail that includes the text data included in the transmission request in the body text, and that is addressed to a predetermined mail address included in the transmission request, to a mail server by using the network interface 16 (steps S212, S213). As a result, an e-mail including the text data is sent to the mail address.

Here in FIG. 7, image data is transferred from the image forming apparatus 10 to the information processing terminal 20 via the network. This is because the image forming apparatus 10 does not include the OCR function that is needed by the terminal application 21, but the terminal application 21 needs to execute an OCR process. Furthermore, in step S211, the text data is transferred from the information processing terminal 20 to the image forming apparatus 10.

Meanwhile, in FIG. 6, image data and text data are not transferred between the information processing terminal 20 and the image forming apparatus 10. In FIG. 6, the extension program is dynamically applied to the image forming apparatus 10, and therefore an OCR function can be dynamically added to the image forming apparatus 10. However, in FIG. 6, there is a need to transfer the extension program from the information processing terminal 20 to the image forming apparatus 10. Therefore, when the data size of the extension program is smaller than the total data size of the image data and the text data, the sequence of FIG. 6 is more capable of increasing the possibility of reducing the overall processing time, compared to the sequence of FIG. 7. Furthermore, it is possible to reduce the transfer load of the extension program by creating the extension program by a script, etc. Note that generally, the program and the script have smaller data sizes than the image data. Furthermore, the number times of transmitting the extension program to the image forming apparatus 10 is once in step S102. Therefore, generally, the sequence of FIG. 6 is more capable of suppressing the communication load between the information processing terminal 20 and the image forming apparatus 10, compared to the sequence of FIG. 7.

As described above, according to the present embodiment, it is possible to improve the operability via the network with respect to data stored in the device. Particularly, as in the present embodiment, when the information processing terminal 20 functions as the operation unit of the information processing terminal 20, there is a need to perform various kinds of communication at high speed such as inputting instructions by the user and sending a response from the image forming apparatus 10, between the information processing terminal 20 and the image forming apparatus 10. Therefore, assuming that data of a large data size is transferred between the information processing terminal 20 and the image forming apparatus 10, the responsiveness of the operation unit is highly likely to be degraded. As a result, the user is highly likely to feel stress. According to the present embodiment, occurrence of such a situation can be suppressed.

Note that steps S201 through S206 of FIG. 7 may be executed before step S101 or before step S106 of FIG. 6. In this case, steps S110 through S115 do not need to be executed. That is, a process relevant to a scan job does not need to be implemented in the OCR library. Furthermore, the output method of the text data generated by the OCR process may be a method other than mail transmission. That is, the process implemented in the extension program is not limited to a predetermined process.

Furthermore, the data processing (image processing) that the image forming apparatus 10 is caused to execute by the extension program may be a process other than an OCR process. For example, a process of converting image data may be performed, or a process of generating print data relevant to the image data may be performed. Furthermore, the image data that is the process target of the extension program does not need to be image data input according to a request from the information processing terminal 20. For example, data stored in the image forming apparatus 10 in advance may be the process target of the extension program.

Note that the present embodiment is applicable to a device other than the image forming apparatus 10. For example, a projector, a digital camera, an electronic blackboard, or a TV conference system may replace the image forming apparatus 10, and the present embodiment may be applied.

Note that in the present embodiment, the image forming apparatus 10 is an example of a device. The information processing terminal 20 and the client device 30 are examples of an information processing apparatus. The registration unit 121 is an example of a receiving unit. The stub unit 130 is an example of a call unit.

According to one embodiment of the present invention, a device and an information processing method are provided, which are capable of improving the operability via a network with respect to data stored in a device.

The device and the information processing method are not limited to the specific embodiments described herein, and variations and modifications may be made without departing from the spirit and scope of the present invention.

The present application is based on and claims the benefit of priority of Japanese Priority Patent Application No. 2014-159452, filed on Aug. 5, 2014, the entire contents of which are hereby incorporated herein by reference.

What is claimed is:

1. An information processing method comprising:
storing image data in a device;
connecting the device to an information processing apparatus via a network;
receiving, by the device, a program having a data size that is smaller than the data size of the image data, from the information processing apparatus via the network;
calling the program received at the receiving, and
causing, by the program, the device to execute image processing with respect to the image data stored in the device by sending an execution request from the program to the device.

2. The information processing method according to claim 1, wherein
the calling includes calling the program in response to a call request for calling the program, received via the network.

3. The information processing method according to claim 1, wherein
the program causes the device to execute the image processing with respect to the image data, which is input to the device in response to a request from the information processing apparatus.

4. The information processing method according to claim 1, wherein
the program causes the device to execute input of the image data into the device.

5. The information processing method according to claim 1, wherein the program is an optical character recognition library.

6. The information processing method according to claim 5, wherein the method further comprises:
receiving, from the information processing apparatus via the network, a program registration request that contains parameters for scanning, optical character recognition, or mail transmission; wherein the program registration request is a request for registering the received program in the device.

7. The information processing method according to claim 6,
wherein the calling includes calling the program in response to a call request for calling the program, received via the network; and
wherein the call request and the program registration request are implemented by a single function.

8. The information processing method according to claim 1, wherein after the receiving step and before the causing step, image data is not transferred between the information processing apparatus and the device.

9. A non-transitory computer-readable storage medium that contains instructions, which when executed, cause a computer that constitutes a device, to execute a method comprising:
storing image data in the device;
connecting the device to an information processing apparatus via a network;

receiving, by the device, a program having a data size that is smaller than the data size of the image data, from the information processing apparatus via the network;

calling the program received at the receiving, and causing, by the program, the device to execute image processing with respect to the image data stored in the device by sending an execution request from the program to the device.

10. The non-transitory computer-readable storage medium according to claim 9, wherein the calling includes calling the program in response to a call request for calling the program, received via the network.

11. The non-transitory computer-readable storage medium according to claim 9, wherein the method further comprises:

causing, by the program, the device to execute the image processing with respect to the image data, which is input to the device in response to a request from the information processing apparatus.

12. The non-transitory computer-readable storage medium according to claim 9, wherein the method further comprises:

causing, by the program, the device to execute input of the image data into the device.

* * * * *